May 26, 1964  A. DE FUSCO ETAL  3,134,831
METHOD OF MAKING AN OPEN HOLLOW ARTICLE FROM A PLASTISOL
Filed Jan. 18, 1962  3 Sheets-Sheet 1
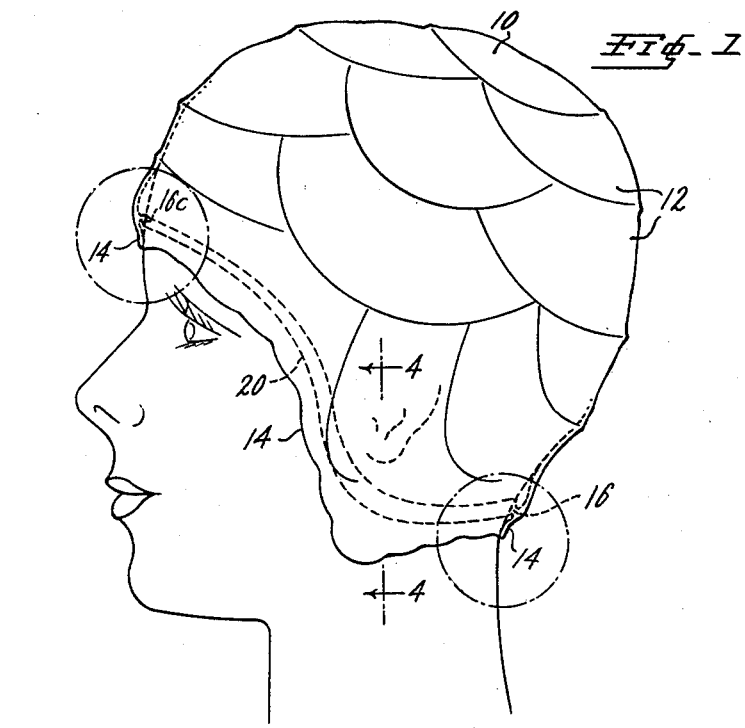
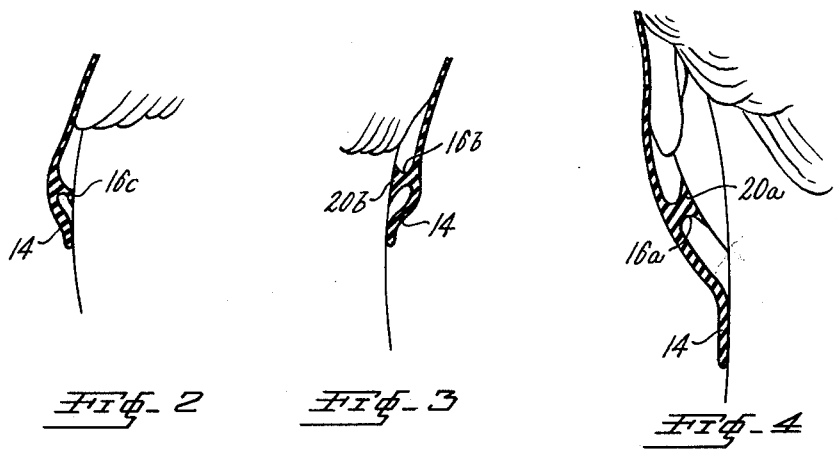
INVENTORS
ARMANDO De FUSCO
FRANK R. WEIGERT
BY James J. Long
AGENT

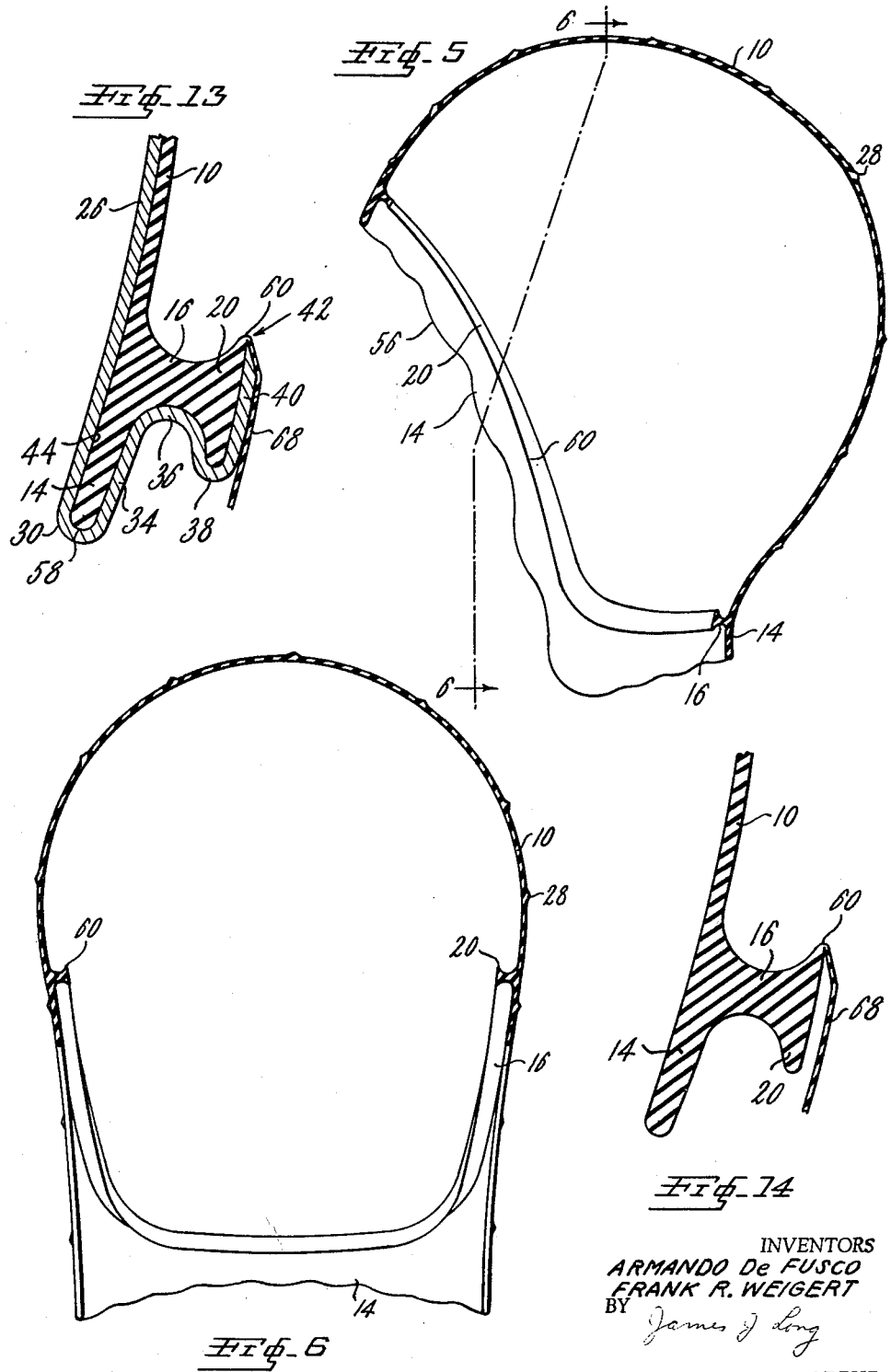

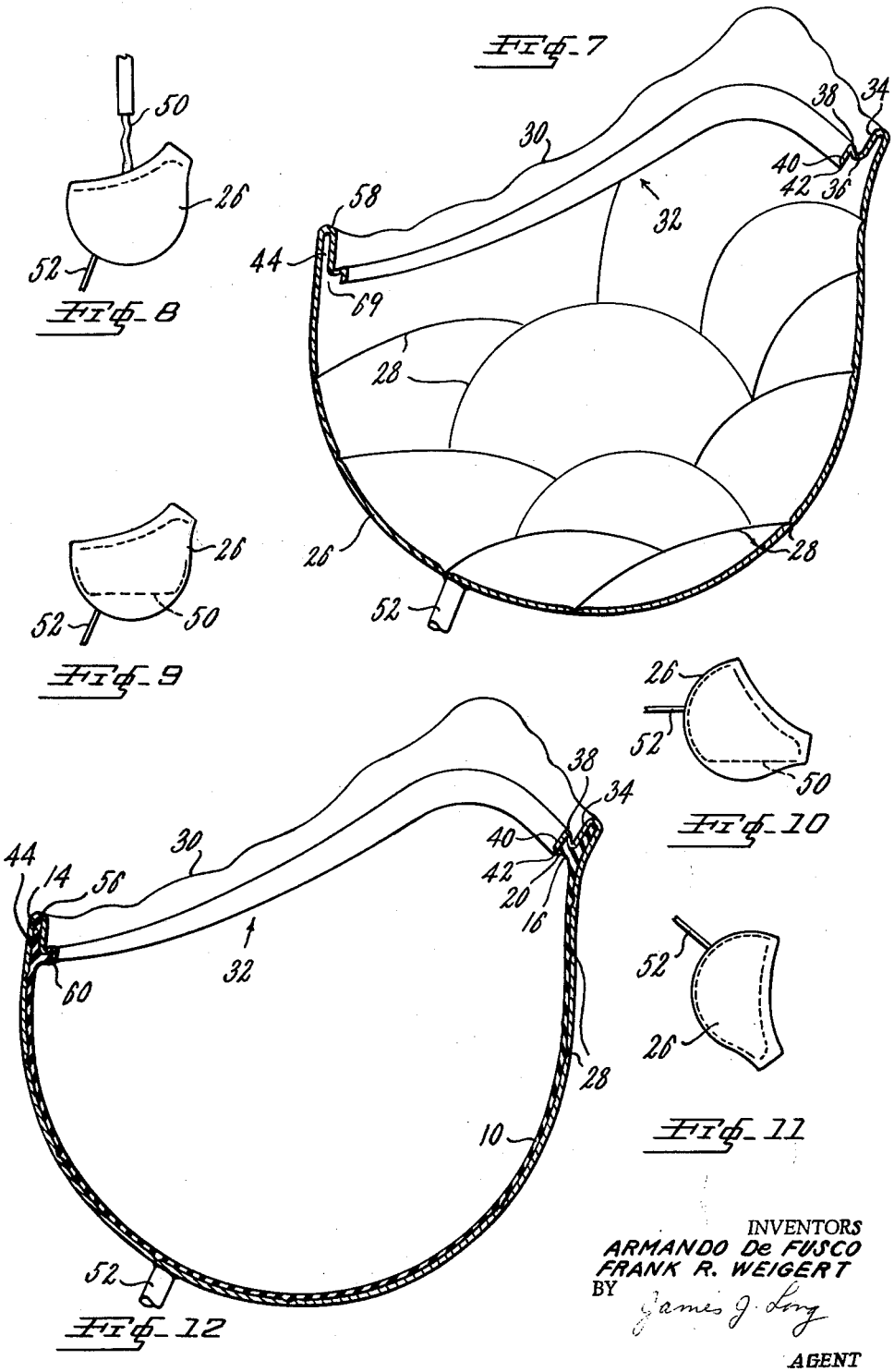

United States Patent Office 3,134,831
Patented May 26, 1964

3,134,831
METHOD OF MAKING AN OPEN HOLLOW
ARTICLE FROM A PLASTISOL
Armando De Fusco, Providence, and Frank R. Weigert,
Warwick, R.I., assignors to United States Rubber Company, New York, N.Y., a corporation of New Jersey
Filed Jan. 18, 1962, Ser. No. 167,084
5 Claims. (Cl. 264—161)

This invention relates to a method of making an open hollow object such as a bathing cap, and more particularly it relates to a method of making a bathing cap having a sealing means on its interior surface near the marginal edge thereof, such sealing means being formed integrally with the cap.

One object of the invention is to provide a method of making a bathing cap having superior water-exclusion qualities.

Another object is to produce a bathing cap having improved comfort features.

Still another object is the provision of a method for making such a bathing cap having decorative designs on its exterior surface.

It is still another object of the invention to provide a method of making an article of the foregoing kind in a one-piece mold.

Yet a further object is to provide a method for forming such bathing cap or other hollow open article with its outer edge smoothly formed and free from either a trim line or an edge formed by a mold parting line.

The manner in which the invention achieves the foregoing objects, as well as additional objects and advantages, will be made manifest in the following detailed description which is intended to be read with reference to the accompanying drawings, wherein:

FIG. 1 is a side view of a bathing cap made by the method of the invention, on the head of a wearer;

FIGS. 2, 3 and 4 are enlarged fragmentary sectional elevational views, taken at the front, back and ear areas, respectively, of FIG. 1;

FIG. 5 is a sectional view of the bathing cap on a somewhat larger scale than FIG. 1;

FIG. 6 is a sectional view taken along lines 6—6 of FIG. 5;

FIG. 7 is a sectional view of a mold suitable for practicing the invention, in an upright position;

FIGS. 8, 9, 10 and 11 are views of the mold on a smaller scale, showing successive positions of the mold in various stages of forming the cap from a hardenable liquid;

FIG. 12 is a sectional view of the mold on the same scale as FIG. 7, showing a bathing cap of plastic material formed therein;

FIG. 13 is an enlarged fragmentary sectional view of the edge area of the mold with the cap formed therein; and, FIG. 14 is a similar view of the cap as removed from the mold, before trimming.

Heretofore, bathing caps have been produced by pressure molding using a two-piece outer mold and a cooperating inner core, in order to produce a design on the outside of the cap and a water-sealing band on the inside. With such prior type of three or more piece mold the design of the water-sealing band is limited since in order to allow the mold to open there can be no undercuts, perpendicular reverse curves, etc. Caps and other hollow articles such as waterproof footwear, rubber gloves, and the like, as well as bathing caps, have also been made using various latices in dipping, slush molding, and rotational casting methods. Any of these latter processes produces designs on one side of the article only.

The present invention utilizes a mold which produces an open hollow article having an inwardly projecting configuration, such as a sealing band, on the inside surface and at the same time any desired relief configuration on the outside surface, such as a decorative design.

More particularly the invention provides a method of making a bathing cap made of waterproof, flexible and preferably somewhat elastic material, such as rubber or plasticized vinyl resin, having a water-sealing means in the form of an inwardly projecting web extending generally perpendicularly from the interior surface of the cap near the marginal edge thereof, such web terminating in a flange-like member which extends generally transversely of the web (and generally parallel to the inner surface of the cap). The inner face of the flange-like portion presses against the skin of the wearer in use forming an effective, but comfortable, seal against the entrance of water to the inside of the cap.

In another aspect, the invention provides a method of making a bathing cap in a one-piece mold comprising a hollow head-shaped body member having an opening therein, the edge of said opening corresponding to the edge of the desired bathing cap, a tongue member attached to the edge of the opening and extending into the interior of the mold in spaced relation to the interior surface of the mold and forming a slot-like cavity for molding the edge area of the cap, said tongue having a radially inwardly extending portion defining a molding surface for a web member of a sealing band of the cap, said tongue having a portion extending transversely of said web-forming portion and defining a molding surface for a flange member of said sealing band, the terminal edge of said flange-forming portion being a knife-like edge which forms a trim line of the mold.

In more detail, and referring to FIGS. 1–6 of the drawings, a typical bathing cap made by the method of the invention includes a head-shaped main body portion 10 having a decorative design 12 integrally formed in relief on its outer surface. The cap has a marginal edge portion 14 which is typically made somewhat thicker than the main body of the cap, and which may present a scalloped appearance or other desired irregular decorative outline.

On the interior of the cap near the edge there is an integrally formed inwardly extending web-like member 16 arranged generally perpendicularly to the interior surface of the cap. The web 16 is preferably heaviest or thickest around the ear areas (16a, FIG. 4) where it is most difficult to form a water seal, and may be somewhat lighter or thinner toward the back of the cap (16b, FIG. 3), while in the region of the front (16c, FIG. 2) where sealing is easiest it may be even thinner and more flexible.

The terminal end or inner end of the web 16 is provided with an integral transverse flange 20 or broadened out portion that is wider than the web is thick. Such flange or widened portion is generally parallel to the interior surface of the cap and may extend entirely around the cap but is most necessary in the region of the ears and back. In the form of the invention shown the flange is heaviest or thickest in the difficult-to-seal area of the ears (20a, FIG. 4) and is somewhat lighter or narrower at the back (20b, FIG. 3), while it may taper off gradually in width as it progresses from the ear areas to the front of the cap (as is best seen in FIG. 5), where water-sealing is no particular problem, and where the web 16 may take the form of a relatively thinner and flexible membrane or flap.

The described construction of the water-sealing rib, comprising the web 16 and the flange 20, is referred to as an "I-beam" construction. An advantageous feature of the "I-beam" construction of the water-sealing rib or band is that it allows a flat inner seal (the exposed or inner surface of the flange 20) to contact the wearer's head in such a manner as to produce a water-tight seal, without causing discomfort. This is in contrast to previously proposed water-sealing bands, which usually have relatively sharp or narrow ribs or ridges, intended to form suction cups or dams, and which could only keep water from seeping in as long as they indented the skin surface rather sharply, with consequent discomfort. If such conventional caps are made to fit loosely in an effort to alleviate the discomfort, they do not provide effective water exclusion. The presently described construction having a flat-surface "I-beam" seal can contact the wearer's head with sufficient force to provide a tight seal and yet remain comfortable because the sealing surface is broad and does not indent the skin sharply. The sealing pressure is spread out over a substantial area of the skin, instead of being concentrated on narrow lines.

Another desirable feature of the "I-beam" sealing construction is that the web 16 of the "I-beam" serves to space the sealing surface 20 radially inwardly away from the interior surface of the cap itself. This means that the sealing surface can have a diameter considerably less than the diameter of the cap itself so that the body of the cap itself can be relatively loose fitting, and can accommodate the head and hair without discomfort or pressure, at the same time that a water-tight seal is provided by reason of the appreciably smaller diameter of the sealing band. An advantageous feature resides in providing a relatively greater wall thickness at the edge area 14 of the cap, in the zone of the sealing band, in comparison to the average wall thickness in the remaining body portion of the cap. Such increased thickness serves to increase the tension around the base line and consequently provides greater pressure of the sealing band against the skin.

It is desired to point out that the most difficult place to exclude water is under and directly in back of the ears. Therefore, the web is preferably made heavier in this area in order to give more support to the flange at this point so that it may be held tight against the skin of the wearer (particularly with the aid of a chin strap or the like) without distorting the sealing band contour. Also, the flange is preferably made wider at this point to provide a better seal. The problem is slightly less critical in the back of the cap and does not require as heavy a supporting web. Therefore, a somewhat narrower or lighter flange and smaller web is usually sufficient at the back of the cap, since there is less irregular bone structure at the back of the wearer's neck than is present just behind the ears. The flange and supporting web need to be sufficiently rigid so that when pressed against skin the skin will distort to press against the flat face of the flange, rather than have the flange distort or tilt and admit water.

Along the forehead extending down past the eyes of the wearer is the easiest place to exclude water. Therefore, the "I-beam" construction may taper off gradually as it approaches the center front of the cap, where it may take the form of a simple relatively light flap or membrane. Water-sealing bands cause the most discomfort to a wearer along the forehead and, therefore, the band is preferably made as light as possible at this point.

Considering now the mold employed in the invention, used for making the bathing cap or similar open, hollow object having design features or relief structural features impressed on both its inner and outer surfaces, reference may be had especially to FIGS. 7–12 of the drawings. FIG. 7 shows an empty one-piece open hollow mold 26 for making the exemplified bathing cap, the mold being shown in an upright position from the standpoint of the process of making the cap (and in an inverted position from the standpoint of the normal position of the finished cap in use). The inner surface 28 of the mold is provided with an engraved or otherwise applied relief design corresponding to the decoration desired on the outside surface of the cap. The mold may be made of metal or any other suitable rigid material, preferably having good heat-transfer characteristics.

The upper edge 30 of the mold, that is, the edge of the opening of the mold, is provided with an inner irregularly shaped tongue member generally designated by the numeral 32 extending down into the hollow interior of the mold and spaced radially inwardly from the inner mold surface around the entire perimeter of the mold. The tongue member 32 includes a first downwardly extending portion 34, a generally radially inwardly extending portion 36, an upwardly extending portion 38, and finally a second downwardly extending portion 40 terminating in an exposed knife-like edge 42 (trimming edge). A slot-like angular space or cavity 44 defined between the inner surface of the mold and the radially inwardly spaced surface of the first downwardly extending portion 34 of the tongue 32 has the thickness and irregular edge contour of the marginal edge area 14 (FIGS. 1, 12) of the cap.

The radially inwardly extending portion 36 of the tongue 32 forms a molding surface corresponding to the web 16 (FIGS. 1, 12) of the "I beam" sealing band, while the upwardly extending portion 38 and second downwardly extending portion 40 of the tongue 32 serve as molding surfaces to form the flange 20 (FIGS. 1, 12) of the "I-beam" sealing band.

In accordance with the invention, the cap 10 is formed in the mold 26 from a hardenable liquid such as latex or a vinyl plastisol, which is initially in the form of a liquid but is capable of being converted to a solid state.

An example of a suitable plastisol is the pasty or creamy liquid made by dispersing finely powdered polyvinyl chloride resin in a liquid plasticizing medium in which the resin is only slowly soluble at room temperature, but which dissolves the resin at elevated temperature, producing a homogenous material which is solid at room temperature, according to the following typical formulation:

| Ingredients: | Parts by weight |
| --- | --- |
| Powdered polyvinyl chloride resin | 100 |
| Plasticizer[1] | 125 |
| Stabilizer (e.g. dibasic lead phosphite) | 2 |
| Pigment (e.g. titanium dioxide) | 6 |

[1] May be a mixture of plasticizers such as 100 parts dioctyl phthalate, 20 parts butyl benzyl phthalate, and 5 parts of a polymeric plasticizer such as an epoxy type, e.g., "Paraplex G–62" as described at Industrial and Engineering Chemistry, Vol. 37, page 504 (1945).

Application of heat to such a fluid plastisol first causes it to "gel" to an essentially non-fluid but relatively weak state, while more severe heating causes it to "fuse" to a state where it is solid and very strong upon cooling.

If desired the plastisol formulation may include a small amount of a blowing agent, which liberates gas at elevated temperature, thereby forming small bubbles which lower the apparent density of the article and gives it a softer feel.

The method of the invention may be regarded as a combination of slush casting and rotational casting. Slush casting may be defined as performed by filling a heated mold completely with the heat-gellable liquid and dumping out the excess, retaining only that portion which adheres to the mold as a result of gelling caused by contact with the heated surface. Rotational casting may be defined as performed by adding a measured amount of liquid to a cold closeable mold. This mold is heated while rotating through all planes. The entire charge is distributed and gelled on the inner surface. The present method is a combination of these methods, involving preheating the mold, charging with an excess, dumping out the excess, and distributing and gelling the remainder by rotational means.

In more detail, in practising the present method the mold is preheated to a temperature above that at which the plastisol or similar heat-sensitive fluid becomes sufficiently gelled so that it will not flow of its own weight.

The mold is partially filled with an amount of fluid which is greater than what is needed to form the cap, and then drained, leaving a controlled amount of fluid within the mold, which amount results in the desired weight cap. This is achieved by the rate of drainage and the angle to which the mold is depressed, as will be exemplified in more detail below.

Application of heat, accompanied with rotation of the mold, causes the initially freely flowable fluid to form a layer of essentially non-flowable gel on all surfaces of the mold that are wet by the fluid. The thickness of the deposit thus formed is dependent on the amount of fluid initially gelled upon contact with the heated mold and upon subsequent gellation of the draining fluid. Further heat is applied to the mold to cause fusion of the gelled plastisol (or vulcanization in the case of a rubber composition). After cooling the object is stripped from the mold. The undercut or entrapped areas strip easily because of a reduction in wall thickness as the object is tensioned and elongated.

For example, a bathing cap may be made in accordance with the invention as follows:

(1) Preheat the mold in hot air (or other suitable heat source) to an elevated temperature (e.g., 150–300° F., frequently about 200° F.) above that required to convert the liquid into a non-flowing paste. This temperature will vary with such factors as the gelling characteristics of the compound, the desired weight of the article, and the heat capacity of the mold.

(2) As shown in FIG. 8, pour into the open top of the heated mold an amount of plastisol 50 which is in excess of the amount of material in the final cap, but is less than required to fill the mold. For example, the volume of plastisol added to the mold may be two to ten times the volume of material in the final cap, but considerably less than one-half of the volume of the mold. As a specific example, in a case where the volume of the material in the final cap was about one-quarter pint, about one pint of material could be charged to the mold (a greater amount, such as one quart, could be charged but this would only result in cycling more compound and spending more time filling). The mold is preferably rotated while it is being filled, most suitably by rotating the mold about the shaft 52 slowly (e.g. at a speed of about 12 r.p.m. [revolutions per minute], although the exact speed is not critical), the axis of rotation being tilted somewhat (e.g. about 25° from the vertical), with the result that the fluid is distributed over a larger area of the mold. Rotation of the mold during this filling step is not essential but has the advantage of preventing air from being trapped in the compound in addition to aiding distribution of the compound. Some of the plastisol gels substantially immediately upon contact with the mold surface, and the thickness of the gelled layer tends to increase progressively from the time filling is started until final drainage. The amount of gelation is a function of both time and temperature.

(3) When filling is complete (FIG. 9) and after a short dwell time, e.g. about 20 seconds, rotation of the mold is stopped and the mold is immediately tilted to a position about 90° from the vertical as illustrated in FIG. 10. Axial rotation of the mold is stopped during this tilting in order to avoid throwing the plastisol out of the mold. Typically about 3 to 7 seconds are consumed in going from the approximately 25° filling position (FIGS. 8 and 9) to the approximately 90° position (FIG. 10). A controlled amount of drainage, amounting to about one-half of the original charge, takes place during this operation. Thus, by this time about one-half pint (of the pint originally charged) has drained out while one-half pint remains in the mold. The material which now remains in the mold is partly in the form of a non-flowable coating on the mold wall and partly in the form of a small pool of liquid, shown in FIG. 10.

(4) When the mold reaches the 90° position shown in FIG. 10, axial rotation of the mold is immediately begun again and tilting is continued to the complete drainage position. With the particular mold and procedure exemplified, the proper final drainage position is about 125° to the vertical as shown in FIG. 11 but this will vary with the mold design and the amount of material it is desired to have in the finished cap. The final drainage position is such that as the mold is rotated the front band of the cap at its lowest point of travel goes through the same horizontal plane as the back band of the cap goes through at its lowest point of travel, thus insuring complete and uniform filling of the band area of the mold. A period of about 10 to 15 seconds frequently expires in going from the approximately 90° position of FIG. 10 to the approximately 125° position of FIG. 11, and about one-quarter pint drains out during this period. The excess plastisol is mostly drained out at this point thus minimizing the amount spread onto the exterior of the mold. Axial rotation is continued in the fully drained position (FIG. 11) until gelation is complete (about 1½ minutes after reaching the FIG. 11 position).

(5) To advance the gelation additional heat is supplied to the mold (as by infrared lamps, or by blowing heated air [at a temperature of, e.g., 300–400° F.] against the mold, or by other suitable heat source) starting when the mold reaches the approximately 90° position (FIG. 10) and continuing for a period of about 1½ minutes after reaching the approximately 125° position (FIG. 11), at the end of which period there is no ungelled material left in the mold.

(6) Rotation of the mold is stopped and it is placed in an oven heated to a temperature of 400° F. for five minutes to fuse the article.

(7) The mold is cooled with water and the cap is stripped out of the mold with the aid of an air jet. To aid in removal of the cap, the mold may be provided with a small opening (not shown) through the body thereof, for example near the crown or at any other convenient location, equipped with a one-way valve through which air under pressure may be forced to separate the cap from the mold.

From the foregoing it will be apparent that the method of the invention makes it possible to produce hollow objects such as bathing caps without resorting to the heavy and expensive hydraulic equipment necessary with conventional compression or injection molds. With such conventional molds extensive undercut areas to form (1) loose membranes or (2) protuberances which lie parallel to a surface and which are integral along an edge are difficult or impossible to achieve. With the present method such desirable attachments in the form for example of a water-tight band extending radially inwardly inside a bathing cap, are easily produced, while at the same time providing either a smooth outer surface or a relief design on the outer surface; the configuration or relief effects on the inside and outside surfaces being formed to any desired contour entirely independently of each other.

A particularly desirable feature of the method of the invention resides in the fact that the trim line of the mold is formed at a tongue which serves to entrap the draining fluid during the molding operation, thereby making it possible to achieve the desired attached membranes and protuberances with a minimum of scrap. Thus, the exposed edge 56 (FIGS. 5, 12) of the present cap, which normally would be the site of the trim line in a conventional cap, is instead a molded edge formed by the peak 58 (FIG. 7) of the slot-like cavity 44 defined between the inner surface of the mold near the edge area and the first downwardly extending portion 34 of the tongue 32. The trim line of the present cap is not on an externally visible edge, but occurs at the upper edge 60 (FIGS. 5, 6, 12, 13 and 14) of the flange 20 and is defined by the knife-like mold edge 42 or trimming edge (FIGS. 7, 12 and 13) of the second downwardly extending portion 40 of the tongue 32. The quality of the product and the design possibilities are enhanced because the trim line is no longer on the visible edge. The mold construction is such as to make the inner trim line "self-trimming," that is, no actual cutting operation is necessary, since the small excess of overflowed material or "flash" can simply be pulled off manually, when the cap is made by the method described. The reason for this will be particularly apparent by considering FIGS. 13 and 14 wherein it will be seen that the terminal knife-edge 42 of the mold portion 40 results in a correspondingly very thin connection 69 or nexus between the cap and the overflowed material 68, with the result that when the excess material is simply grasped and torn off manually a cleam trim line results at 60 without the necessity for a cutting operation. The self-trimming feature is aided by the fact that in the present procedure the amount of material that flows over the edge of the mold as the plastisol is being gelled is limited. This is controlled in part by charging only a limited excess of material to the mold in the first instance and in part by the drainage procedure. Rotation of the mold during drainage spreads the excess over a larger area so that only a relatively thin film of excess gells on the outer edge of the mold, and the cross section at the knife edge is very thin. If the mold was not rotated during final drainage and if a large excess of material was discharged slowly, a thick film would be formed over the knife edge which would not be self trimming and would have to be removed by cutting.

The exterior of the cap made in accordance with the invention not only has no trim line, but it has no edge formed by a mold parting line. The fact that the self-trimming edge of the cap is on the top edge of the inner band allows complete freedom of design around the face line of the cap. Conventionally molded or dipped caps require hand trimming around the face line, and any irregular contours that have to be trimmed make the manufacturing cost prohibitive as well as causing the cap to tear easily due to nicks in the edge caused by trimming operations. Molded rubber, latex rubber, or vinyl resin is known to have poor tear resistance once a tear is started. Since the outer edge of the present cap is completely formed in its final shape during the molding, no trimming is required and this eliminates any possible cuts that may lead to tearing.

The invention therefore allows design of a bathing cap or other hollow open article without restrictions as to molds closure, under-cuts etc. The described water-sealing band arrangement, developed after pool testing of many possibilities, provides a cap with a formed or molded irregular face line edge for pleasing design, with a design motif on the outside of the cap, and an inner seal comprising an "I-beam" construction allowing a flat surface of a smaller circumference than the cap itself (forming an inner seal) to contact the wearer's head, particularly around and under the ears. The present cap therefore provides greater comfort combined with better water exclusion qualities than have been obtainable in previous commercially produced bathing caps.

The manner in which the tongue arrangement 32 of the mold forms a kind of dam and provides cavity spaces 44 and 69 (FIG. 7) in which the edge area of the cap and the web and flange of the sealing band of the cap are formed by hold-up of draining fluid in the final drainage step as illustrated in FIG. 11 is particularly advantageous from the standpoint of making it possible to form radially inwardly protecting flaps or membranes or the like, including protuberances with undercuts, such as have heretofore been possible, if at all, only with complicated and expensive multi-piece molds.

Having thus described our invention, what we claim and desire to protect by Letters Patent is:

1. A method of making a bathing cap from a plastisol comprising providing an open hollow mold having a design configuration impressed in relief on the interior walls thereof and having a tongue member extending inwardly of the mold around the opening thereof to form a dam defining a cavity having the outline of a desired sealing band on the interior of the cap near the edge thereof, preheating the mold to the gelling temperature of the plastisol, charging the mold with a volume of plastisol which is from two to ten times the volume of plastisol in the finally desired cap but is less than the volume of the mold, rotating the mold to distribute the plastisol over the inner surface of the mold, the plastisol in contact with said surface becoming gelled, stopping the rotation, pouring out the bulk of the ungelled plastisol, resuming the said rotation while maintaining the mold in a position of complete drainage to drain out all of the ungelled plastisol except that amount which is retained by the said dam to form the said sealing band, completing the gelling and fusing of the material which remains in the mold, and thereafter removing the resulting bathing cap from the mold.

2. A method of making, from a plastisol, a bathing cap having a design configuration in relief on its exterior surface and an inwardly extending sealing band on its inner surface near the marginal edge of the cap comprising providing an open hollow mold in the shape of said cap having said design configuration in relief on its interior walls and having a tongue member extending inwardly of the mold around the opening thereof to form a dam defining a cavity having the outline of the said sealing band, preheating the mold to the gelling temperature of the plastisol, charging the mold with a volume of plastisol which is two to ten times the volume of plastisol in the finally desired cap but is not more than half the volume of the mold, the mold being in an upright position with the opening thereof facing upwardly, rotating the mold about an axis partially inclined to the vetrical to distribute the plastisol over a greater area of the mold, the said plastisol becoming gelled where it contacts the mold surface, stopping the said rotation, tilting the mold to a partial drainage position to discharge most of the excess plastisol from the mold, subjecting the mold to a higher temperature to advance the gellation and fusion of the plastisol, resuming rotation of the mold and tilting the mold to a complete drainage position in which all of the ungelled plastisol flows out of the mold except for that portion retained by the said dam to form the said sealing band integrally with the remainder of the cap, completing the gelling and fusing of the plastisol in the mold, cooling the mold, and removing the resulting bathing cap therefrom.

3. A self-trimming method of making a bathing cap from a plastisol comprising in combination the steps of providing an open hollow mold having interior walls in the configuration of the desired cap and having a tongue member attached to the interior edge of the mold opening to form an inwardly extending sealing band on the interior of the cap, the said tongue member terminating in a knife edge, preheating the mold to a temperature sufficiently elevated to gel the plastisol, charging the mold with a volume of plastisol that is in excess of the volume of plastisol in the final cap but is less than the volume of the mold, rotating the mold to distribute the plastisol over the bulk of the interior surface of the mold, the plastisol in contact with the mold surface becoming gelled, stopping said rotation, tilting the mold to a partial drainage position to discharge the bulk of the ungelled plastisol from the mold, resuming the rotation while tilting the mold to a complete drainage position to discharge the small remaining excess plastisol, some of the ungelled plastisol being retained by the said tongue member and being distributed around said tongue member by said rotation to form said sealing band integrally with the remainder of the cap, completing the gelling and fusing of the plastisol, cooling the mold, removing the cap, any gelled overflowed plastisol which is attached to the cap being connected thereto by a thin nexus corresponding to the location of said knife edge, and removing said gelled overflowed plastisol by pulling it away from said sealing band.

4. A method of making a bathing cap from a plastisol comprising providing an open hollow mold having interior walls defining the configuration of the cap, preheating the mold to the gelling temperature of the plastisol, adding to the mold while the mold is in a substantially upright position a volume of plastisol which is from two to ten times the volume of the material in the finished cap but which is less than half the volume of the mold, rotating the mold about an axis slightly inclined from the vertical, partially tilting the mold to a greater angle from the vertical to discharge about half of the material in the mold, continuing said rotation and tilting the mold further to a complete drainage position to discharge all of the excess material from the mold, and continuing said rotation to distribute the remaining material completely over the walls of the mold and gel said material in the form of the desired cap, increasing the temperature to fuse the gelled plastisol, thereafter cooling the mold and removing the resulting solid cap therefrom.

5. A self-trimming method of making an open hollow article from a plastisol comprising in combination the steps of providing an open hollow mold having interior walls in the configuration of the desired article and having a tongue member attached to the interior edge of the mold opening to form an inwardly extending band on the interior of the article, the said tongue member terminating in a knife edge, preheating the mold to a temperature sufficiently elevated to gel the plastisol, charging the mold with a volume of plastisol that is in excess of the volume of plastisol in the final article but is less than the volume of the mold, rotating the mold to distribute the plastisol over the bulk of the interior surface of the mold, the plastisol in contact with the mold surface becoming gelled, stopping said rotation, tilting the mold to a partial drainage position to discharge the bulk of the ungelled plastisol from the mold, resuming the rotation while tilting the mold to a complete drainage position to discharge the small remaining excess plastisol, some of the ungelled plastisol being retained by the said tongue member and being distributed around said tongue member by said rotation to form said band integrally with the remainder of the article, completing the gelling and fusing of the plastisol, cooling the mold, removing the article, any gelled overflowed plastisol which is attached to the article being connected thereto by a thin nexus corresponding to the location of the knife edge, and removing said gelled overflowed plastisol by pulling it away from said band.

References Cited in the file of this patent

UNITED STATES PATENTS

| | | |
|---|---|---|
| 2,280,636 | Kraft | Apr. 21, 1942 |
| 2,736,925 | Heisler et al. | Mar. 6, 1956 |
| 2,880,468 | Mooney et al. | Apr. 7, 1959 |
| 2,939,180 | Hickler et al. | June 7, 1960 |